Jan. 10, 1933.  U. G. CORNELL  1,894,021
FILM RECORD
Filed Oct. 25, 1927
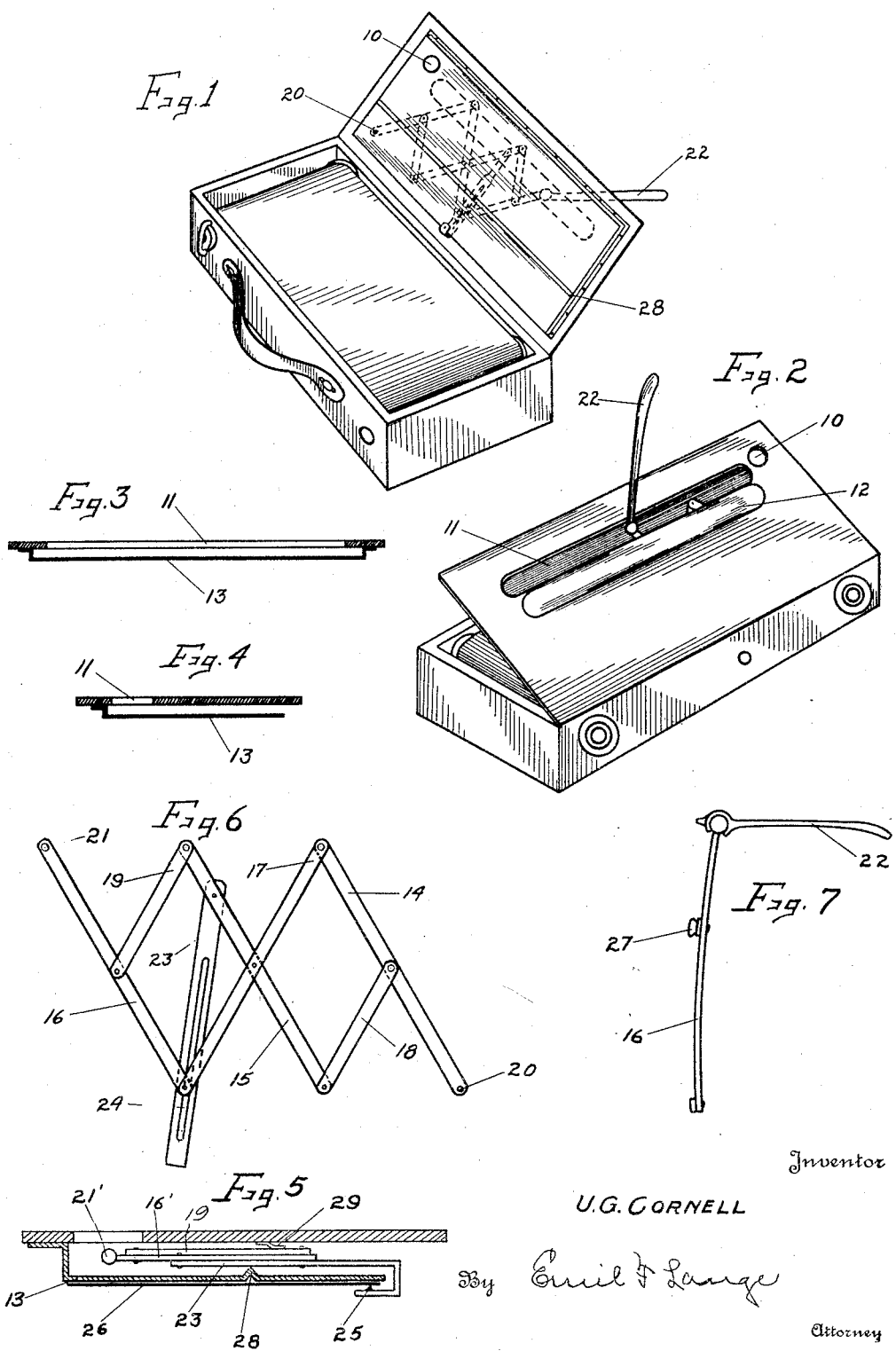
Inventor
U. G. CORNELL
By Emil F Lange
Attorney Patented Jan. 10, 1933

1,894,021

UNITED STATES PATENT OFFICE

ULYSSES G. CORNELL, OF LINCOLN, NEBRASKA

FILM RECORD

Application filed October 25, 1927. Serial No. 228,643.

My invention relates to devices for placing a record on the films in photographic cameras before the films are developed whereby the record will appear on the finished negative.

I am aware that devices which are intended for a like purpose have gone into extensive use, but the prior devices are all open to serious objections. The stylus which is used for making the record is usually separate from the other parts of the device and the result is that neither it nor a satisfactory substitute is available when needed. In the prior devices, carbon paper is generally used for recording the legend. Aside from the extra cost of the carbon paper and the cost of incorporating it in the roll film, it is disagreeable when developing the film and it is apt to smudge or entirely ruin the film.

The object of my invention is the provision of a device which is operable from the outside of the camera for writing directly on the gelatine surface of the film, the stylus being a part of the device and therefore always available for use.

Having in view these objects and others which will be pointed out in the following description, I will now refer to the drawing, in which Figure 1 is a view in perspective of the camera box with the back open to show the false back and showing also in dotted lines the linkage for writing directly on the gelatine surface of the roll film.

Figure 2 is a perspective view showing the back of the camera and showing particularly the slit through which the writing is effected.

Figure 3 is a lengthwise section through the back of the camera and showing both the back with the slit and the false back.

Figure 4 is a similar section through the back and the false back of the camera, the section being taken at right angles to that of Figure 3.

Figure 5 is a sectional view similar to Figure 4 but showing a light trap and also a modified form of the false back.

Figure 6 is a plan view of the linkage.

Figure 7 is an edge view of the link to which the stylus is attached, the link also serving as a lever in order to bring the writing point into contact with the gelatine surface of the roll film.

My invention depends on the fact that the pressure of a blunt metallic point on the gelatine surface of a photographic film produces an effect similar to that of light so that when the film is developed the negative will have a record of all of the points and lines which have been traced on the film by the metallic point.

The invention is applicable to all makes of cameras using a roll film. The back of such a camera is provided with a window 10 which is generally covered with a transparent material of a red color to display to the operator the numerals on the back of the paper covering for the film. The camera box is provided with a slit 11 which is similar to the slit commonly used in autographic cameras. To protect the interior parts of the camera from dust and other extraneous matter it is desirable to provide a spring closing door 12 for covering the opening 11 when not making a record on the film. On the inside of the back of the camera box there is secured a false back 13, this being secured to the back in light tight relation at its top and at both of its sides. As shown in Figures 3 and 4, the false back 13 is spaced slightly from the back, this space being provided for the reception of the linkage.

The linkage includes three links 14, 15 and 16 which are parallel to each other, a link 17 connecting the opposite ends of the links 14 and 16, a link 18 connecting the extremity of the link 15 to the link 14 at an intermediate point and a link 19 connecting the link 15 with the link 16 at an intermediate point. All of the connections between the links are pivotal and the link 14 is pivotally secured at 20 to the false back. It will be readily apparent that when the free extremity of the link 16 is moved back and forth a parallel motion of the linkage is produced which is similar in many respects to that of the pantograph. The free end of the link 16 is exposed within the slot 11 of the camera box. This free end 21 is preferably ball shaped so that the handle or stylus 22 may be connected to the link 16 by means of a ball and socket joint to give great flexibility of movement and to prevent detachment of the stylus from the linkage. The stylus 22 is preferably so formed that it can easily be reached by the fingers when the lid 12 is in its open position. For this purpose the stylus may be slightly curved as shown in Figures 2 and 7 or it may be made of resilient material and so shaped that its free end will spring outside the plane of the back of the camera box when the lid is opened. For the convenience of the operator, a projection 22a may be formed on the lever 22 at its joint. This projection will bear against the surface of the false back to materially assist in the proper guiding of the lever 22. The stylus 22 may, however, be omitted entirely from the assemblage by providing an aperture or socket in the free end portion of the lever 16, as shown in Figure 6, for receiving the point of a pencil or other convenient pointed instrument for manipulating the linkage.

At a suitable point in the link 15 between the pivots connecting that link with the links 17 and 19 there is pivotally secured a lever 23 having a slot 24 which engages the head of the pivot pin connecting the links 16 and 17. The end portion of the lever 23 passes around the edge of the false back 13 and projects slightly over the opposite surface. At the overhanging end portion the lever is provided with a blunt point 25 of suitable material for engaging the gelatine surface of the roll film 26. The movements of the stylus 22 will thus be communicated to the point 25, preferably in reduced size.

For causing the point 25 to press against the gelatine film, the link 16 may be bowed as shown in Figure 7 and provided with a fulcrum 27. The result of this construction is that whenever the stylus 22 is used as a writing tool the downward movement of the stylus will be converted into an upward movement of the opposite extremity of the link 16. This, of course, brings the point 25 into intimate contact with the gelatine surface while the stylus is being used but the point is out of contact with the gelatine surface when the film is being rolled in the camera. This feature is an important one as it avoids the marking of the film when winding up the film. The same result, however, may be obtained in various other ways of which I have shown one in Figure 5. In this instance the link 16′ is formed straight but the fulcrum is in the form of a bead 28 which is pressed into the material of the false back 13. Downward pressure on the stylus would in this case have the same effect on the point 25 that it has in the Figures 6 and 7 construction. The bead 28 has a second function. It extends entirely across the false back as shown in Figure 1 and it bears against the linkage as shown in Figure 5. It thus traps most of the stray beams of light which might creep through the tortuous passageway when the camera is being used in a strong light.

The false back 13 is preferably made from sheet metal and as before stated it is secured to the back in light tight relation at three of its edges. The fourth edge must, however, be left open to permit the free end of the lever 23 to move back and forth. This edge is the most remote from the slot 11 and there is little danger that light can enter the slot 11 and pass over the lower edge of the false bottom to flash the film. In order to avoid all possibility of danger from this source I provide a light trap 29 as shown in Figure 5. This light trap is secured to the back of the camera box so that its free edge contacts with the linkage. The light trap 29 is preferably made from a very thin and flexible strip of sheet brass which is covered with velvet. The light trap 29 in conjunction with the bead 28 thus effectively prevents the entrance of stray beams of light into the camera chamber. Incidentally, however, the light trap also serves to keep the writing point 25 out of contact with the roll film since it exerts a yielding pressure on the linkage to force the point away from the film.

In the use of the device, the roll film is inserted in the camera in the usual manner. After the end has been secured to the winding roll, the paper backing of the film must be given a slight pressure at one or both of its ends to cause it to buckle. By then closing the back of the camera box, the point 28 passes under the buckled portion of the paper backing so that as the film is rolled into position in the closed camera, the point 28 will be adjacent the gelatine surface of the film. In case it is desired to render the device inoperative, it is only necessary to close the camera without first buckling the paper. The portion having the point 25 thereon will then be positioned behind the film roll where it will have no effect on the film.

Having thus described my invention in such full, clear, and exact terms that its construction and operation will be readily understood by others skilled in the art to which it pertains, what I claim as new and desire to secure by Letters Patent of the United States is:

1. In a device of the character described, a box camera having a slot in its back wall and extending lengthwise thereof, a linkage secured for movement parallel to the back wall of said box camera and on the inner side thereof, means for actuating said linkage through the slot in the back wall of said camera box, and a lever secured to said linkage, the extremity of said lever being adapted to bear against the sensitized surface of the roll film and to reproduce the movements of said means for actuating said linkage.

2. In a box camera having a film roll, the back wall of the box camera being provided with a slot extending lengthwise thereof adjacent its upper edge, a false back secured at its upper and both of its side edges to the back wall of the camera box on the inner side thereof and having its body portion spaced therefrom, a linkage between said false back and the back wall of the camera, one extremity of said linkage being pivotally secured to said false back and the other end of said linkage being exposed in the slot of the back wall of the camera box and being freely movable, a lever secured to said linkage and movable in response to the movements thereof and a stylus secured to said lever, said stylus being adapted to bear against the sensitized surface of the roll film and to reproduce the movements of the free end of said linkage.

In testimony whereof I affix my signature.

ULYSSES G. CORNELL.